(12) United States Patent
Steeneken et al.

(10) Patent No.: US 8,098,120 B2
(45) Date of Patent: Jan. 17, 2012

(54) SPRING STRUCTURE FOR MEMS DEVICE

(75) Inventors: Peter G. Steeneken, Valkenswaard (NL); Jozef Thomas Martinus Van Beek, Rosmalen (NL); Theo Rijks, Eindhoven (NL)

(73) Assignee: EPCOS AG, Munich (DE)

( * ) Notice: Subject to any disclaimer, the term of this patent is extended or adjusted under 35 U.S.C. 154(b) by 220 days.

(21) Appl. No.: 11/718,130

(22) PCT Filed: Oct. 24, 2005

(86) PCT No.: PCT/IB2005/053475
§ 371 (c)(1),
(2), (4) Date: Nov. 12, 2007

(87) PCT Pub. No.: WO2006/046192
PCT Pub. Date: May 4, 2006

(65) Prior Publication Data
US 2008/0135385 A1 Jun. 12, 2008

(30) Foreign Application Priority Data
Oct. 27, 2004 (EP) .................... 04105335

(51) Int. Cl.
*H01H 51/22* (2006.01)
(52) U.S. Cl. .................... 335/78; 200/181
(58) Field of Classification Search .............. 335/78; 200/181
See application file for complete search history.

(56) References Cited

U.S. PATENT DOCUMENTS

| | | | |
|---|---|---|---|
| 6,115,231 A * | 9/2000 | Shirakawa | 361/233 |
| 6,418,006 B1 | 7/2002 | Liu et al. | |
| 6,777,284 B2 | 8/2004 | Van Melick et al. | |
| 7,038,301 B2 | 5/2006 | Seki et al. | |
| 7,265,477 B2 * | 9/2007 | Wan | 310/309 |
| 2002/0149071 A1 | 10/2002 | Shim | |
| 2005/0224916 A1* | 10/2005 | Musalem et al. | 257/595 |

FOREIGN PATENT DOCUMENTS

| | | |
|---|---|---|
| DE | 4205340 C1 | 8/1993 |
| EP | 1024512 A | 8/2000 |
| EP | 03104045.4 | 10/2003 |
| GB | 2 353 410 A | 2/2001 |
| JP | 2004-200151 A | 7/2004 |
| WO | WO 99/21204 A1 | 4/1999 |
| WO | 2004/037713 A1 | 5/2004 |
| WO | 2004/050863 | 6/2004 |

* cited by examiner

*Primary Examiner* — Bernard Rojas
(74) *Attorney, Agent, or Firm* — Slater & Matsil, L.L.P.

(57) ABSTRACT

A MEM device has a movable element (30), a pair of electrodes (e1, e2) to move the movable element, one electrode having an independently movable section (e3), resiliently coupled to the rest of the respective electrode to provide additional resistance to a pull in of the electrodes. This can enable a higher release voltage Vrel, and thus reduced risk of stiction. Also, a ratio of Vpi to Vrel can be reduced, and so a greater range of voltage is available for movement of the movable element. This enables faster switching. The area of the independently movable section is smaller than the rest of the electrode, and the spring constant of the resilient coupling is greater than that of the flexible support. Alternatively, the movable element can have a movable stamp section resiliently coupled and protruding towards the substrate to provide an additional resistance to pull in when it contacts the substrate.

17 Claims, 7 Drawing Sheets

SPRING STRUCTURE FOR MEMS DEVICE

Figure 1:
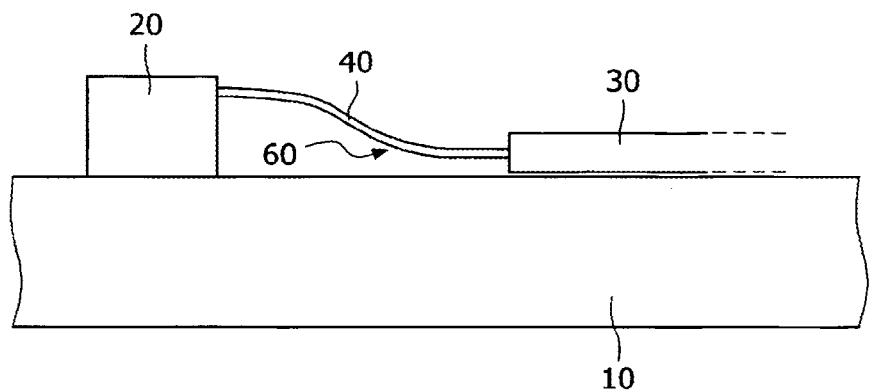

This invention relates to a micro-electromechanical (MEMS) device comprising a first electrode (e1) and a second electrode (e3) that is part of a movable element and movable towards and from the first electrode (e1) between a first and a second position by elastic deformation of a deformable section of the movable element, and that is separated from the first electrode (e1) by a gap in its first position.

The invention further relates to integrated circuits incorporating such MEMS devices, and to methods of offering communication services over such devices.

The term 'MEMS' (Micro-electromechanical system or structure or switch) can encompass various devices. A common arrangement of a MEM device comprises a freestanding beam with a first electrode located opposite a second electrode. The first and the second electrode are mutually separated by an air gap. The first electrode can be moved towards or away from the second electrode by application of an actuation voltage to provide an electrostatic force. In principle other forces could be used such as an inductive force.

Some common applications are:
- use as a microphone or a loudspeaker; (using a specific type of membrane)
- use as a sensor, particularly an air pressure sensor
- use as a resonator
- use as pixel switches in a display, or driving a mirror for an optical switch,
- use in RF applications, particularly as a switch or as a variable capacitance.

One of the commercially important applications is the use for variable impedance matching with integrated band switching in the front end of a mobile wireless device such as a phone or computer.

Two common constructions are as follows:
1. A MEMS structure in a substrate of silicon. In this case the electrodes are oriented perpendicular to the substrate surface. This construction is used for the sensor application and for the resonator application but other applications are not excluded.
2. A MEMS structure as a thin-film element. The beam is here oriented substantially parallel to the substrate. This type of MEMS structure is used for RF MEMS. There are at least two constructions for the beam:
   a double clamped beam, for example a beam that is connected to the substrate surface at two or more sides, so the deflection to the substrate occurs in the centre of the beam. This type of beam is known as a beam with both ends built in and is statically indeterminate.
   a single clamped beam in which case the deflection to the substrate occurs at the end of the beam. This type of beam is called a cantilever beam and is statically determinate.

The beam is generally provided with holes, that are present as a consequence of the etching of the sacrificial layer between the beam and the substrate to create the air gap. These holes also help to reduce air damping by allowing air to flow in and out of the cavity between beam and substrate, while opening or closing the beam. However there are manufacturing techniques in which the beam is assembled to the substrate, so no holes are needed for the etching, for example as described in GB-A-2,353,410.

A device of the kind mentioned in the opening paragraph is known from US 2002/0149071. The MEMS device of this document comprises two separate actuation electrodes on a substrate in between of which an interrupted signal line is present. The movable element is here one metal layer that is electrostatically actuated by the actuation electrodes and includes a switch electrode, so as to connect the two portions of the signal line. The switch electrode is located as a bridge between the two actuation electrodes. These electrodes are connected through flexible elements to a support on a substrate. In fact, this MEMS device operates as a relay.

One of the main failure mechanisms of MEMS switches is stiction, in which the beam or membrane does not release from the counterelectrode when the actuation voltage is removed. It is known to address stiction using coatings or surface roughness such as dimpling, on the contact surfaces.

The known device has large actuation electrodes and these are sensitive to stiction. Such sticking mainly occurs if there is moisture or foreign matter between the moveable actuating stage and the actuation electrodes on the substrate. Sticking may occur in use or during a manufacturing process. Conventionally, a protrusion is prepared or a non-stick stick thin film is formed at the bottom surface of the actuating stage in order to prevent such sticking. In order to limit the stiction, the known device further includes protrusions on the flexible elements or on the substrate opposite the flexible elements. The protrusions may increase the contact resistance when the device is closed. The protrusions will also provide a counterforce against stiction.

However, for RF applications in particular, the switching speed of a switch is of primary importance. And although the known device provides a counterforce against stiction, this counterforce is not very large. The flexibility of the flexible elements inhibits this, certainly in view of the large surface area of the actuation electrodes relative to the effect of the protrusions.

Moreover, for industrial application a good lifetime of the devices is a sine qua non. Therein, the known device is relatively weak. As known in the field, MEMS elements with electrostatic actuation show the Pull-in effect, e.g. above a certain pull-in voltage $V_{PI}$ the movable element will fall down at once on the substrate. The protrusion on the flexible elements is under such circumstances a feature that is very prone to damage, and thus an undesired feature.

It is therefore an object of the invention to provide devices of the kind mentioned in the opening paragraph that have a high speed and are industrially viable. According to a first aspect, the invention provides such a micro-electromechanical device wherein the movable element comprises an independently movable section that is coupled to a main section of the movable element by a resilient coupling, such that the resilient coupling exerts a force on the movable element in a direction away from the first electrode, when the second electrode is in its second position.

The use of an independently movable section that is resiliently coupled to the main section results therein that this section will generally move together with the main section. It will not fall different from any other part of the movable section and hence not be an inherent weak point. Moreover, its independent coupling to the main section allows to set the spring constant of the resilient coupling in accordance with the needs of the design. Therewith, the counterforce against stiction can be enlarged without compromise to the electrical communication or to the suspension of the movable element. It is understood, in the context of this application, that the independently movable section is herein movable as part of the movable element and also separately, as far as this is allowed by the boundary conditions set up by the resilient coupling.

It is an advantage of the device of the invention that the speed of switching can be varied, and also enhanced. This is particularly relevant for RF applications. Much of the switch opening delay is concerned with the initial stage of opening, since the electrostatic attraction is greatest when the electrodes are closest. The independently moveable section can be provided with a different spring force and can contribute to a different rate of opening for example. An advantage of the claimed structure is a non-linear spring response. Compared to the known device, the use of an independently movable section has advantages such as enabling optimization of each spring arrangement independently. Also, reliability and accuracy over a long lifetime can be enhanced if there is no need for an arrangement that is subject to wear and high levels of stress.

It is furthermore observed that the independently movable section could be moved both by application of a force in the movable element, and by a force between the independently movable section and the substrate. Examples of such forces include electric interaction by means of application of a voltage difference, magnetic interaction, piezoelectric forces so as to create a local contraction in the independently movable section, and the mechanical forces of the resilient coupling only. Furthermore, the surface of the independently movable section facing the substrate may be chosen or be chemically modified so as to have an inherent attraction or repulsion to the material of the substrate surface.

A MEMS device that appears at first sight related is known from U.S. Pat. No. 6,418,006. This MEMS device has also has a tunable, first electrode, and separately an actuation electrode. The gap between the tunable electrode and the movable element is smaller than that between the actuation electrode and the movable element. The area of the movable element the large gap portion and the small gap portion is herein shaped to be effectively very rigid. Thereto, the small gap portion is formed in a tray-like shape. However, this known device is in effect very different. The movable element cannot come in contact to the actuation electrode and the small gap portion is by no means independently movable with respect to the main portion of the movable element. As a result, the counterforce against stiction that is provided in the invention, cannot be obtained in this known device.

In a preferred embodiment, the resilient coupling has a larger spring constant than the deformable section. In this manner, the coupling can provide an effective counterforce, that may be suitably larger than the stiction force. The effective barrier of stiction may be expressed as the release voltage $V_{rel}$, as is explained in more detail in the Figure description. In principle, the opposite is conceivable, that the spring constant of the rest of the electrode is higher, if desired. Preferably, the area of the independently movable section is also smaller than the rest of the electrode, which contributes to the greater spring constant of the resilient coupling.

As an additional advantageous feature of the present invention, the flexible elements are arranged to resist a pull in of the electrodes, and a spring constant of the resilient coupling and a position of the independently movable section are arranged to provide additional resistance to the pull in. This can enable a release voltage to be higher, and thus provide a reduced risk of stiction. Also, a ratio of Vpi to Vrel can be reduced, and so a greater range of voltage is available for movement of the movable element. This can also contribute to a faster switch opening speed.

Preferably, the independently movable section has a smaller surface area than the second electrode. This allows to provide a concentrated force to the section, and hence it can be effectively withdrawn from the substrate. Moreover, designing the independently movable section small allows the provision of more than one of such independently movable and resiliently coupled sections. This will further decrease the release voltage VREL, and increase the switching speed. Also, it allows that the stiction force is balanced relatively uniformly over a larger surface area.

As another additional feature, the resilient coupling is arranged on at least two sides of independently movable section of the electrode. This can provide a more stable and reliable structure with less susceptibility to vibration and manufacturing variations for example. In fact, the independently movable section is herein designed within the main section. An advantage hereof, particularly in combination with the embodiment that the movable element is as a whole substantially embodied as a metal layer, that the holes needed for the definition of the independently movable section can be used as etching holes during manufacturing.

As another additional feature, the independently movable section is surrounded by the rest of the respective electrode, at least on three sides. It appears advantageous to provide several independently movable sections at the side faces of the electrode. The shape of the electrode is then actually such that it may prevent the formation of large Eddy currents at the side face of the electrode. Such Eddy currents are generally problematic side effects that turn up at high frequencies. Alternatively, the independently movable section may be provided in the center of the main section. This reduces the stability of the movable element the least and short springs allow for large spring constants k2.

In a preferred embodiment, the independently movable section protrudes towards the substrate. Herewith, the section will be in contact to the substrate before the main section of the movable element. An additional return force may be provided when the independently movable section contacts the substrate. The protrusion of this movable section is suitably embodied as a separate, intermediate layer that is connected to the movable section. This intermediate layer may extend laterally outside the movable section overlying it, or at least outside the portion hereof directly in contact with the intermediate layer. The use of an intermediate layer for the protrusion allows the optimization of the mechanical properties, either by the choice of the material of the intermediate layer or by its lateral extension or pattern. Such a lateral extension has generally a reduced thickness in comparison to the movable section and is thus more elastic. An additional advantage of such a protrusion is a larger design freedom. It is not excluded that the main section is provided with such a protrusion as well, on at least on part of the area that functions as the second electrode.

Specifically, the independently movable section has a rest position in which it has a smaller spacing to the substrate than the spacing between the first and the second electrodes. The reduced spacing implies that even if the independently movable section is not moved independently, but only as part of the movable element, it will nevertheless contact the substrate earlier. It will be understood that an electrode may arranged on the substrate opposite the independently movable section. In that event, the reduced spacing has also an advantage of an electrical nature, in that in fact two microelectromechanical elements are created within one device with different actuation voltages and characteristics.

Therefore, in a first further embodiment, the independently movable section comprises a third electrode and a fourth electrode is arranged on the substrate facing the third electrode so as to form a second pair of electrodes, while the second electrode is arranged as part of the main section of the movable element. Preferably, the second pair of electrodes has another spacing in the rest position than the—first—pair of electrodes. This embodiment allows several designs, in one of which the second pair of electrodes forms a galvanic switch, and the first pair forms an actuator, and optionally also an RF capacitor. Alternatively, both pairs of electrodes may form variable capacitors, and these could be placed either in series or in parallel. Even when using only a limited number of positions of the movable element, such combinations allow the tuning of the resulting capacitance into a plurality of values.

Suitably, the movable element is substantially a single metal beam, in which case the second and third electrode will be mutually connected and present at the same voltage. The resilient coupling is herein embedded as a number of bridges. Alternatives to this best mode exist, which include first of all the use of a movable element on the basis of an electrically insulating beam with electrodes and interconnects on the surface thereof. A specific modification is the use of a piezoelectric material as the beam or as part of the beam. Another alternative is the use of electrically insulating means for the resilient coupling and optionally also for the independently movable section. In case that the independently movable section includes a third electrode, contacts thereto may be established using wirebonding. Particularly suitable in connection herewith, is the use of a separate intermediate layer, which allows the definition of the electrodes and other functional patterns, and thus vertically separating the functionality and the mechanical construction.

In a further embodiment, the deformable section of the movable element is separate from the main section. More particularly, the main section is coupled to a support on the substrate by the deformable section. This separate deformable section is advantageous in that it makes the device insensitive to differences in thermal expansion coefficient between substrate and metal. Including the independently movable section inside this suspension (k1) retains the advantages of this suspension.

Specifically, the device is provided with one or more flexible elements coupled to provide a force on the movable element dependent on the movement and being present between the movable element and one or more protrusions on the substrate. The use of such flexible elements is known per se, but particularly the combination of flexible elements and the resilient coupling has turned out to be an interesting construction, as the mechanical forces of the flexible elements and the resilient coupling may strengthen each other, but also balance each other. Such the flexible supports are arranged on at least two sides of the electrode on the movable element. This can provide a more stable and reliable structure with less susceptibility to vibration and manufacturing variations for example. It can also be used to obtain higher spring constants and makes the device less sensitive to high temperatures during manufacturing or operation.

The MEMS device of the invention is most suitably, but certainly not exclusively a galvanic or capacitive switch with a limited number of states, and in which the first electrode at the same time acts as an actuation electrode. The gap between the first and the second electrode in the first position may be varied.

The device of the invention may also comprise more than one microelectromechanical element having a movable element and an electrode arranged on the substrate. These elements may have the same design, but that is not necessary. In one embodiment, the designs differ with respect to the size of the electrodes, so as to provide different ranges. In another embodiments, the designs differ in view of the different functions of the elements; one element constitutes then for instance a variable capacitor in an impedance matching circuit, while another element constitutes a band switch.

If one device comprises more than one MEMS element, the gap size need not to be the same, but may be varied. Also, the MEMS device of the invention may be of the bistable type, in which the second electrode can be switched between a first electrode on the substrate and a third electrode in a separate element on the substrate. Also in this embodiment, the independently movable section will most suitably provide a counterforce against stiction on the substrate, although it is not excluded that it is designed to provide a counterforce against stiction on the separate element. The contact between the second and the third electrode appears, however, less sensitive to stiction.

The device of the invention suitably comprises further elements, such as thin-film capacitors, resistors, inductors, diodes and the like. These elements will be interconnected according to any design as is suitable and desired for the application. It is observed that thin-film capacitors and inductors can be integrated in the device easily, if the movable element is defined in a metal layer and particularly if an intermediate metal layer is present. The thin-film capacitor is then defined between electrodes in the electrically conducting layer on the substrate and the intermediate layer. In that case, the dielectric layer will be removed only in selected areas on the substrate, which is technologically achievable. The inductor will be defined in the metal layer of the movable element, that has sufficient thickness to arrive at a sufficient Q-factor.

The device of the invention may also be provided with a circuit of transistors. In this case, the device is an integrated circuit, and the microelectromechanical element is defined as part of the interconnect structure or even on top of the passivation layer. The integration of such element in the interconnect structure is for instance known from U.S. Pat. No. 6,777, 284. This embodiment appears particularly suitable, if the microelectromechanical element is used as a resonator or a variable capacitor.

According to a second aspect, the invention provides a micro-electromechanical device having a substrate, a movable element, a driving means to move the movable element towards the substrate, which movable element has an independently movable section resiliently coupled to the rest of the moveable element. Preferably the independently movable section protrudes towards the substrate to provide an additional return force when the independently movable section contacts the substrate. In a further preferred embodiment, one or more flexible elements are present to provide a return force on the movable element dependent on the movement.

This can enable the return force separating the movable element to be increased over part of the range of movement. This can give an additional degree of freedom in designing the devices to suit particular applications. For example the part of the range can be arranged to be where there is a risk of stiction, or where there is most delay in opening, where the electrostatic force is greatest for example. Compared to the non linear spring arrangement mentioned above using a stopper, the use of an independently movable section has advantages such as enabling optimization of each spring arrangement independently. Also, reliability and accuracy over a long lifetime can be enhanced if there is no need for a stopper which can be subject to wear and high levels of stress. Also, it can enable easier construction if there are fewer contact or anchor points on the substrate.

Further features of this aspect are those as discussed with reference to the first aspect. The major difference between both aspects is the presence of the driving means. Electrostatic driving means are preferred, as microelectromechanical devices with such actuation principle can be manufactured in a robust and thus readily industrializable manner. Piezoelectric actuaion means have the advantage of lower driving voltages.

A third aspect provides a micro-electromechanical device having a substrate, a movable element, a driving means to move the movable element towards the substrate, wherein the substrate has a movable section resiliently coupled to the substrate, and protruding towards the movable section to provide an additional return force when the movable section contacts the movable element.

The movable section may also be attached to the substrate, and not to the movable element. The resilient coupling is embodied herein by for instance an elastic layer or a piezoelectric layer between the substrate and the movable section. Alternatively, the movable section could have a cantilever construction.

As an additional feature, the resilient coupling has a higher spring constant than that of the flexible element.

As another additional feature, the flexible supports are arranged on at least two sides of the movable element. This can provide a more stable and reliable structure with less susceptibility to vibration and manufacturing variations for example.

As another additional feature, the resilient coupling is arranged on at least two sides of independently movable section. This can provide a more stable and reliable structure with less susceptibility to vibration and manufacturing variations for example.

Another aspect of the invention includes the use of the device for switching. As a result of the use of the device of the invention, the switching speed is considerably enhanced.

Another aspect of the invention include modules having such devices and at least one semiconductor device. Micro-electromechanical elements and devices such as those of the invention are by definition large in comparison to individual transistors. It is thus suitable to provide combinations as a system-in-a-package concept. Various concepts for modules exist and are known per se. An interesting improvement is the provision of the further semiconductor device into a cavity within the device of the invention. Such a cavity is made in the substrate in particular. This substrate is a semiconductor substrate by preference, although a glass or alumina, polymer, multilayer or other substrate is certainly not excluded. In particular, the substrate is removed at least partially, such that the back side of the semiconductor device is directly connected to a heatsink. Suitably, the semiconductor device is thinned from this back side, so as to reduce the thermal resistance through the substrate of the device. Such a module is described in the application WO-IB2004/050863, that is included herein by reference. The semiconductor device used in this module is first of all a driver for the device of the invention. Additional or alternative semiconductor devices are for instance a power amplifier and a transceiver, or in case of use as a resonator a detection circuit for the device of the invention. In case of a power amplifier module, the device of the invention is suitably used (as part of) an impedance matching circuit with variable capacitance and/or a switch between different frequency bands and between the transmit and receive mode within the module.

Further aspects of the invention include mobile handsets having such devices and methods of offering a communications service over such handsets. This is a recognition that an ultimate purpose of the improved device can be to enable improved communication services which can be charged for. The value of the services can be much greater than the sales value of the devices, which in some cases can be provided free of charge, so all the value comes from the services.

Any of the additional features can be combined with each other and with any aspect of the invention. Other advantages will be apparent to those skilled in the art, especially compared to other prior art. Numerous variations and modifications can be made without departing from the scope of the claims of the present invention. Therefore, it should be clearly understood that the form of the present invention is illustrative only and is not intended to limit the scope of the present invention. How the present invention may be put into effect will now be described by way of example with reference to the appended schematic drawings.

Figure 2:
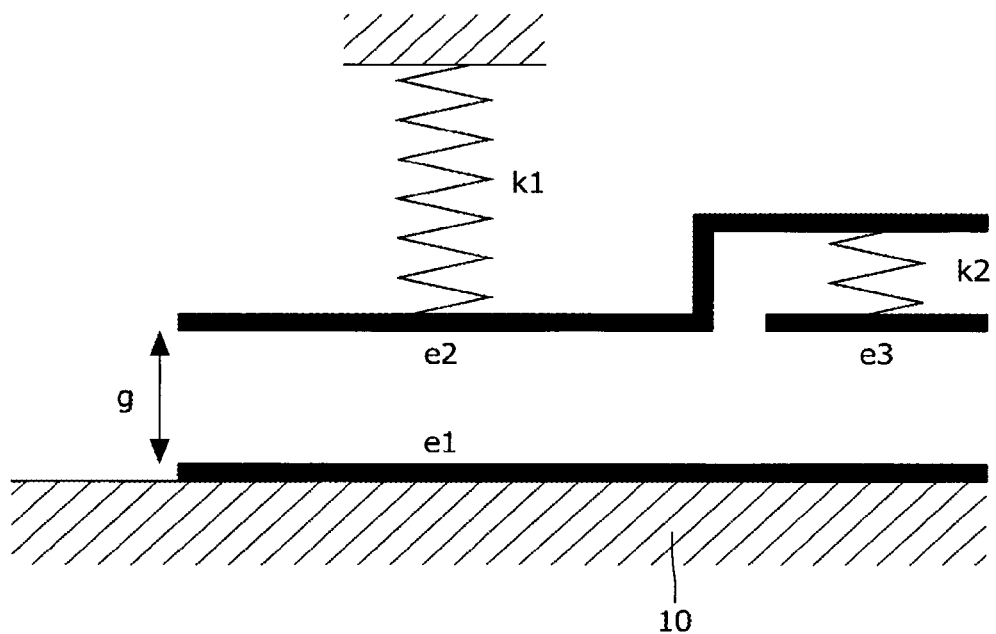
Figure 3:
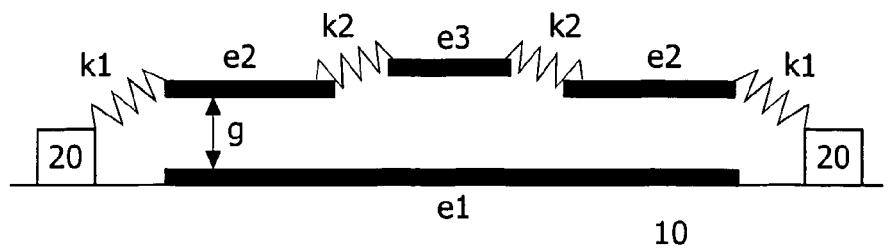
Figure 4:
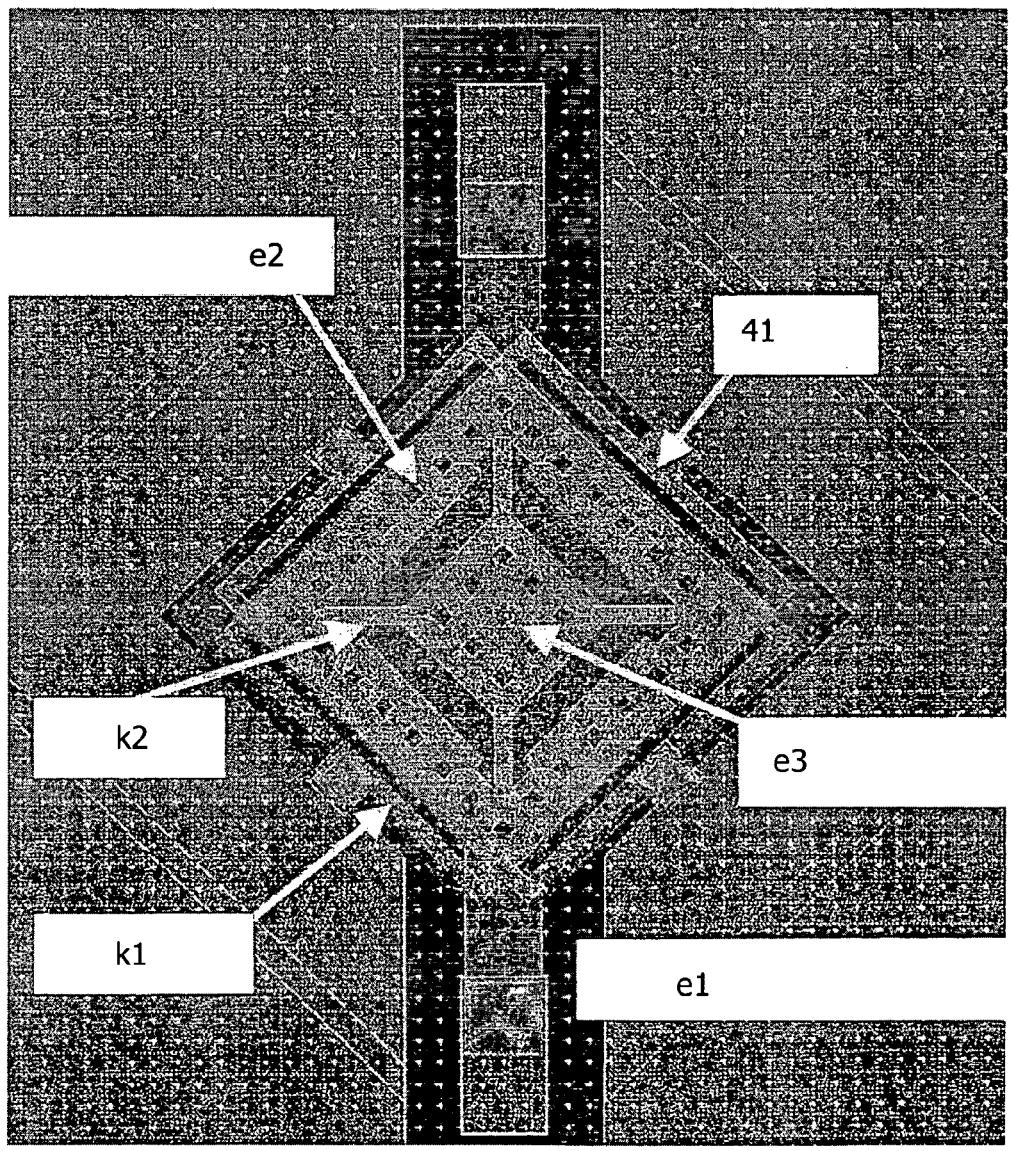
Figure 5:
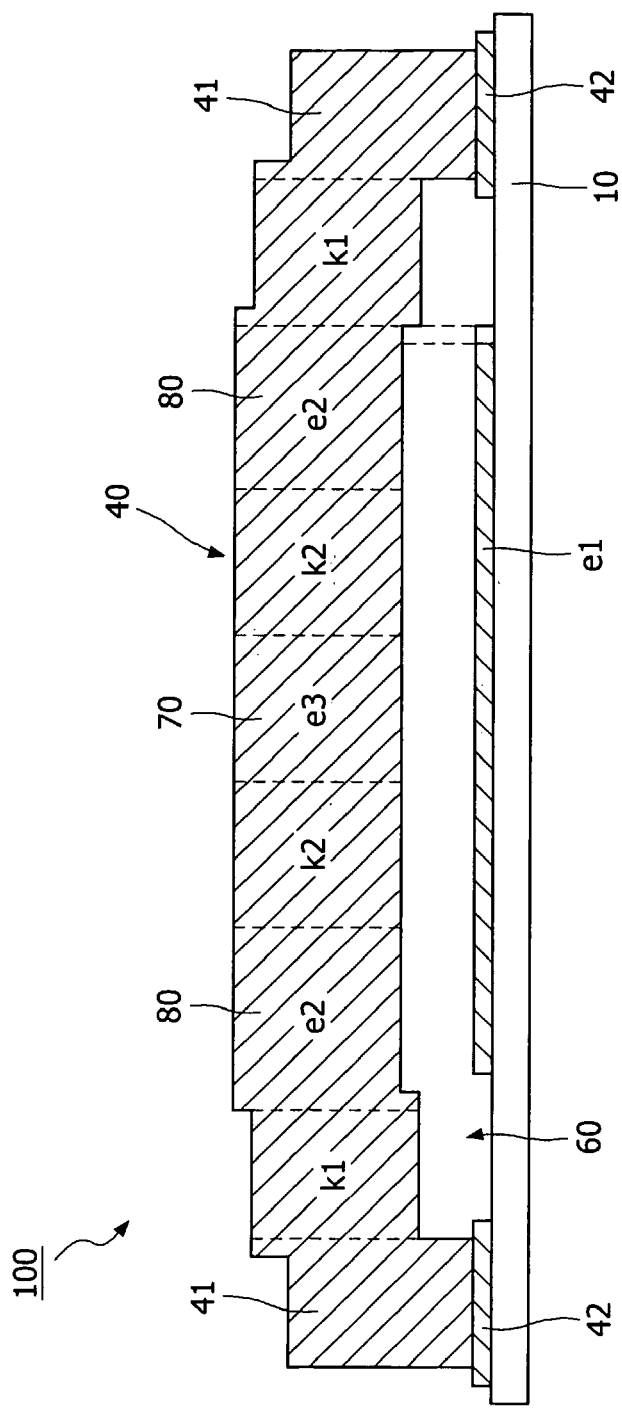
Figure 6:
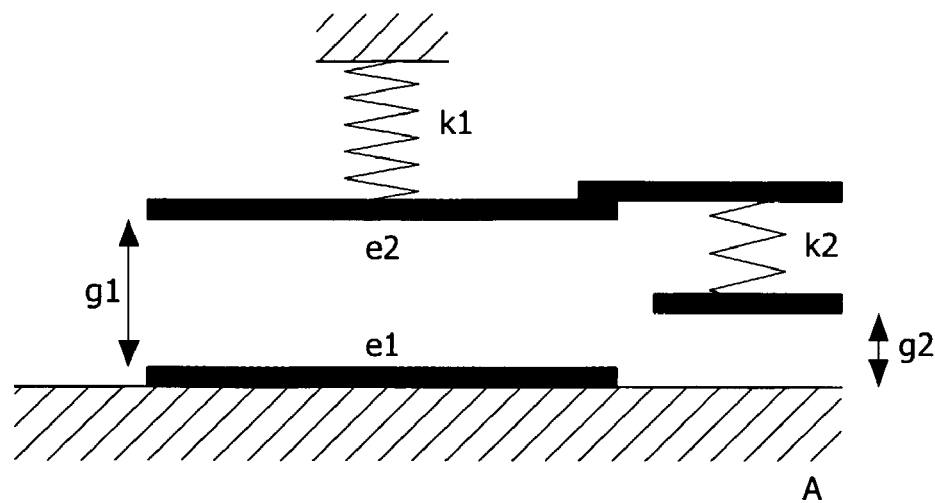
Figure 7:
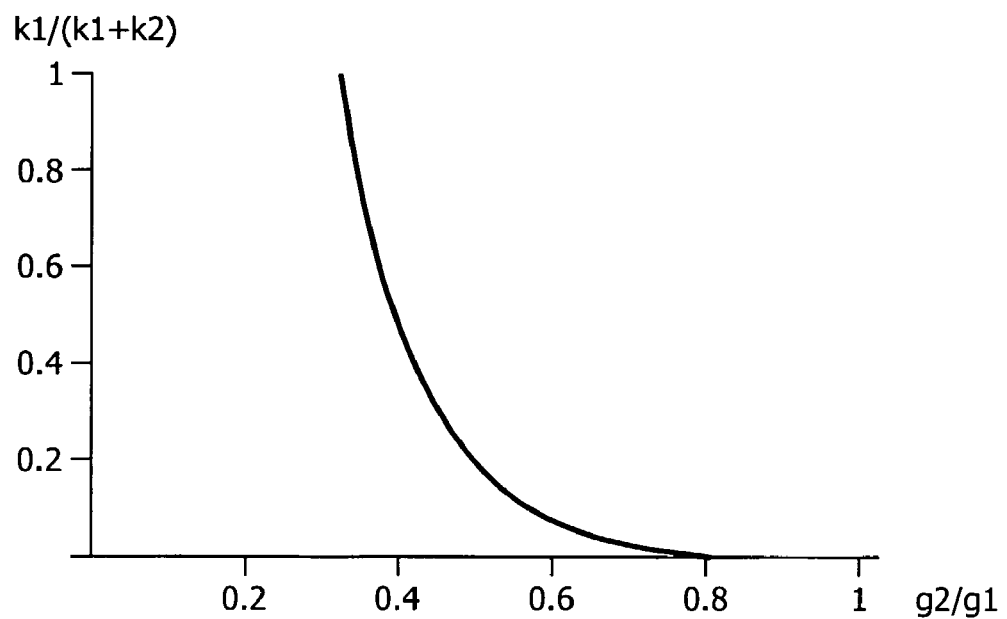
Figure 8:
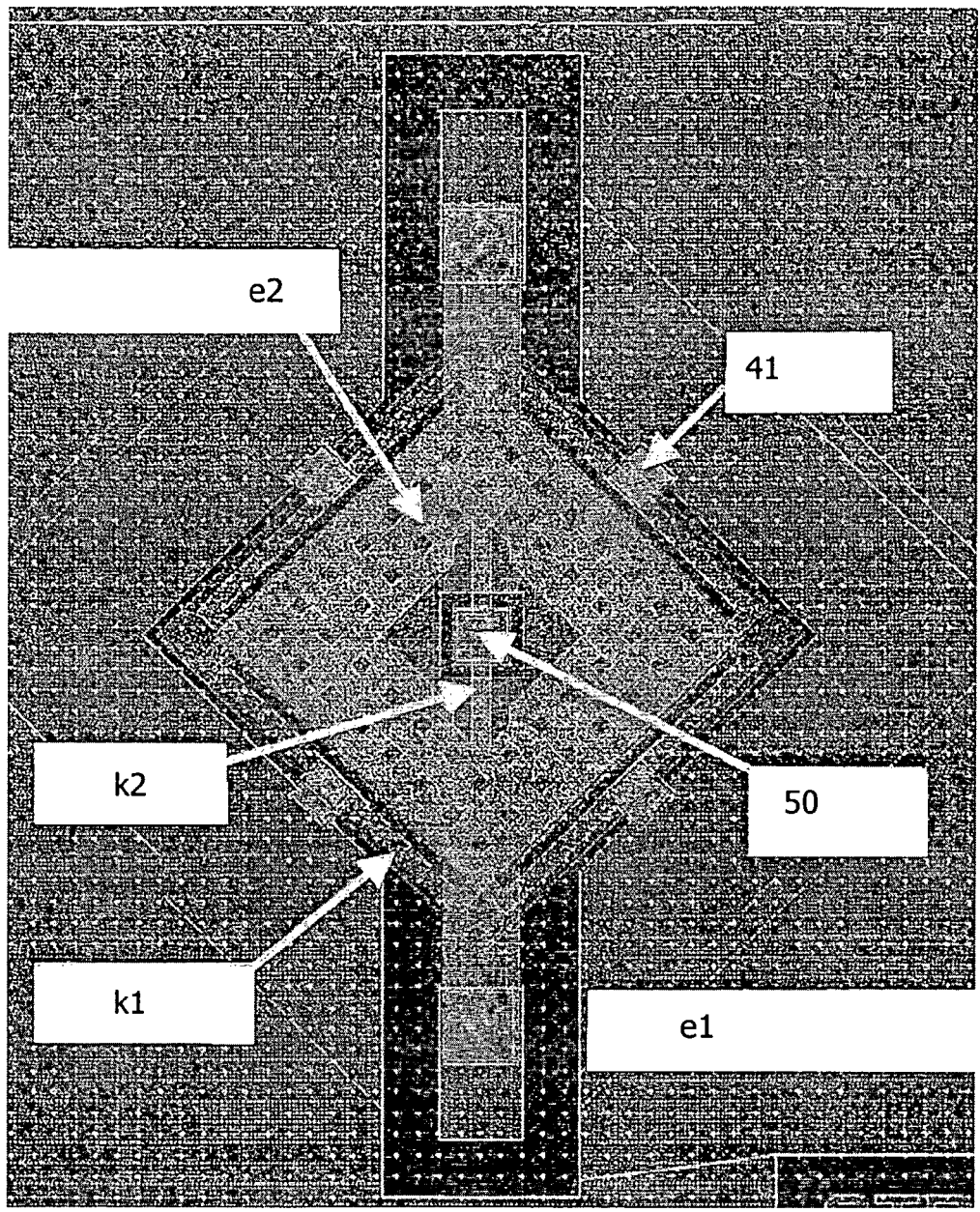
Figure 9:
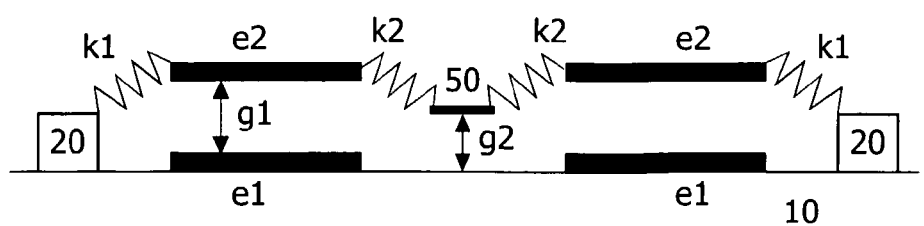
Figure 10:
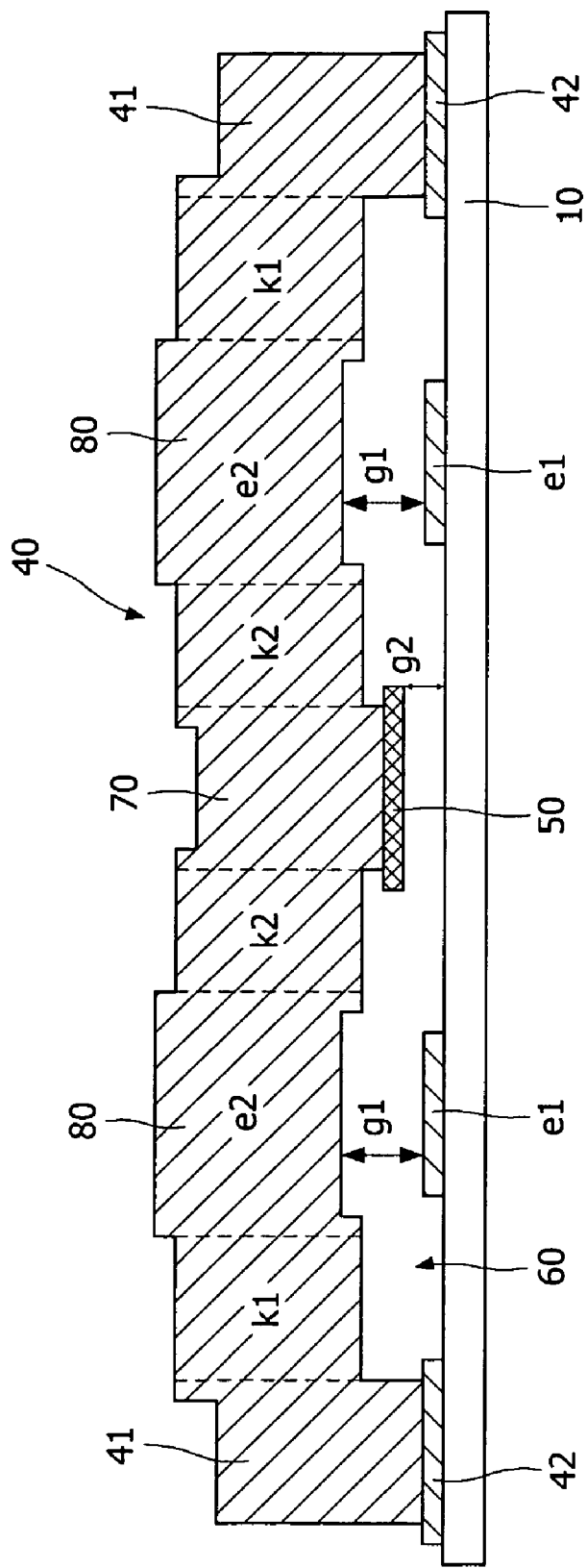
Figure 11:
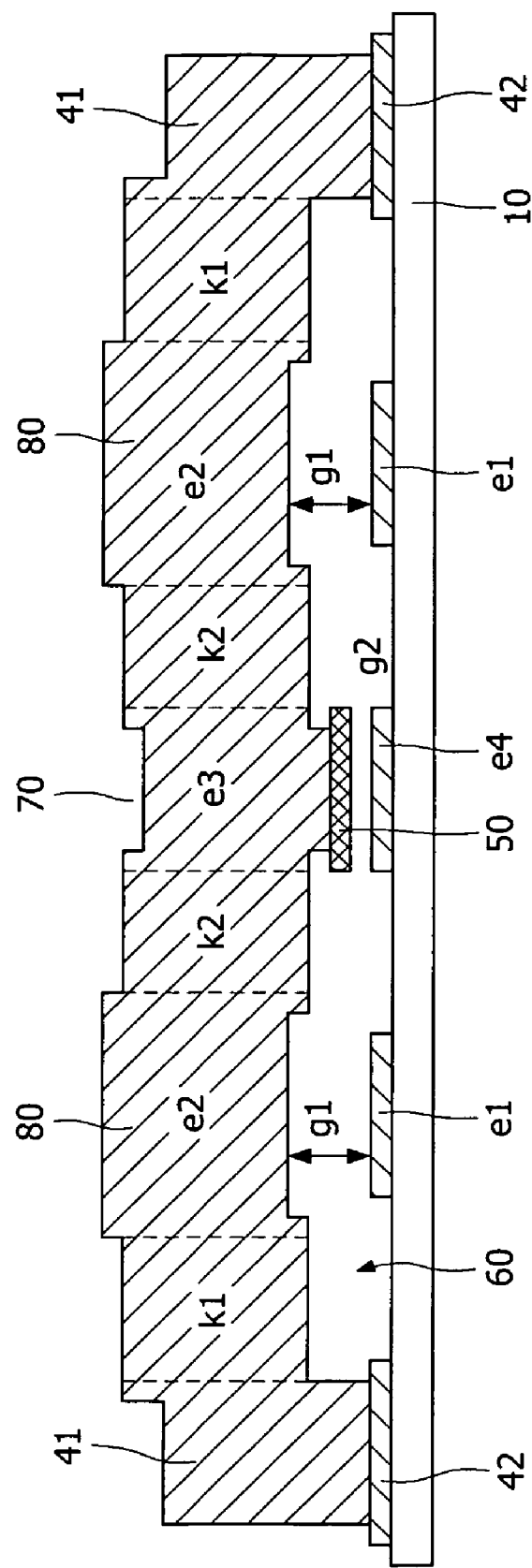

The features of the invention will be better understood by reference to the accompanying drawings, which illustrate preferred embodiments of the invention. In the drawings:

FIG. 1 shows an arrangement known from US 2002/0149071,

FIG. 2 shows a schematic view of an arrangement according to a first embodiment, FIG. 3 shows a schematic view of an arrangement according to a second embodiment, FIG. 4 shows a plan view of a device having an embodiment corresponding to that of FIG. 3, FIG. 5 shows in a cross-sectional and diagrammatical view a device corresponding to that of FIG. 4, FIG. 6 shows a schematic view of a third embodiment, FIG. 7 shows a graph showing how Vpi is affected for various values of k1, k2, g1 and g2 as shown in FIG. 6, FIG. 8 shows a schematic view of a fourth embodiment, FIG. 9 shows a plan view of a device corresponding to that of FIG. 8, FIG. 10 shows in a cross-sectional and diagrammatical view a device corresponding to that of FIG. 9, and FIG. 11 shows in a cross-sectional and diagrammatical view a fifth embodiment of the device.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where an indefinite or definite article is used when referring to a singular noun e.g. "a" or "an", "the", this includes a plural of that noun unless something else is specifically stated.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

FIG. 1 for reference shows a known arrangement in which a movable element 30 is supported above a substrate 10 by a flexure element 40. These are for elastically suspending the moveable element on anchor or support elements 20. The flexure elements have repulsive elements in the form of stoppers 60 for causing a sudden steep increase in the repulsive force of the flexure elements when the flexure elements supporting the moveable element are resiliently deformed by a predetermined amount during movement of the moveable element. The repulsive elements having a predetermined size are stoppers positioned between the flexure elements and static elements fixed on the substrate opposite to the flexure elements. The stoppers may be positioned at portions of the static elements opposite to the flexure elements so that middle portions of the flexure elements contact the stoppers when the flexure elements are resiliently deformed by a predetermined amount. Also, the stoppers may be formed on middle portions of the flexure elements opposite to the static elements so that the stoppers contact the static elements when the flexure elements are resiliently deformed by a predetermined amount.

One of the causes for stiction is charging of the dielectric layer, which causes a shift in the effective voltage of $\Delta V = \rho_s z_d / \in_d$, where $\rho_s$ is the surface charge in the dielectric, $z_d$ is the thickness of the dielectric and $\in_d$ is the dielectric constant of the dielectric. If the charging voltage is larger than the release voltage of the switch (i.e. $\Delta V > V_{rel}$), stiction occurs. Therefore increasing $V_{rel}$ increases the reliability of the switch. However for a conventional switch $(V_{PI}/V_{rel})^2 = 4/27 \ (C_{down}/C_{up})^2$. Therefore an increase in $V_{rel}$ leads to an (usually unwanted) increase of $V_{PI}$. The arrangement of FIG. 1 can alleviate this but has notable practical disadvantages.

A first embodiment of the invention, illustrated in FIG. 2 involves a MEMS design with double spring structure, which can increase $V_{rel}$ while reducing $V_{PI}$ slightly (i.e. reduced stiction). A conventional MEMS switch, comprises 2 electrodes $e_1$ and $e_2$, separated by a gap g and suspended by a spring k. Instead of having a single top electrode, the design of FIG. 2 shown schematically in side view has a segmented top electrode which consists of two parts $e_2$ and $e_3$ which are electrically connected, but mechanically separated by a resilient coupling in the form of a spring $k_2$. Electrode e3 is an example of an independently movable section. The areas of electrodes $e_2$ and $e_3$ are $A_2$ and $A_3$ respectively. It comprises a continuous bottom electrode e1 on substrate 10. Depending on the application for the device, the movable element can be attached for example to a mirror, to electrical switch contacts, or to capacitor plates, and so on.

Effect on $V_{PI}$:

In the illustrated embodiment the spring constant of spring $k_2$ is much larger than that of spring $k_1$. Because the effective spring constant of electrode $e_3$ is thus a bit smaller than that of electrode $e_1$, the pull-in voltage will be slightly smaller, however this effect is only marginal and can be neglected if $k_2$ is much larger than $k_1$. Indeed this can be useful for some applications.

Effect on $V_{rel}$:

When the electrodes are forced close together by applying a higher voltage to them (for applications to switches, this corresponds to a closed state of the switch), the electrostatic force on the top electrodes $e_2$ and $e_3$ is proportional to their area. As the area $A_2$ of electrode $e_2$ is smaller than that of a conventional switch $(A_2 + A_3)$, the electrostatic force is also smaller. Compared to a conventional switch with the same spring constant, the electrode $e_2$ of the proposed switch has therefore a higher release voltage. A notable measure of effectiveness is to compare the ratio $V_{pi}^2/V_{rel}^2$ to $k_2/k_1$. For a case where $A_2 = A_3$, this is a straight line for a conventional single spring device and a curve beneath the straight line for the two spring device. For $k_2/k_1 = 8$ the relative release voltage is increased by about 40% compared to a conventional switch, making the switch more reliable.

Other Consequences:

The double spring structure design will also increase the opening speed of the MEMS device, because stiction effects are reduced and more force is available for accelerating the switch. This is particularly important for switch devices. This mechanism will only be significant in the initial part of the opening motion. As explained above, the double spring structure can increase the reliability of an electrostatic MEMS switch. The design can decrease the ratio $V_{PI}/V_{rel}$ by a factor of about 1.4, which enables the notable increase in the reliability of the MEMS device.

FIG. 3 shows a schematic view of an arrangement similar to that of FIG. 2 but having the movable element supported on both sides, and the independently movable section supported by resilient couplings on both sides. This can bring structural benefits. The independently movable section e3 of the electrodes is shown in a rest position retracted relative to the rest of the electrode e2. This helps enable the electrode section e3 to have a greater separating force resisting the attraction of the electrodes, and resisting stiction.

A plan view of a design of such a device corresponding to the arrangement of FIG. 3 is shown in FIG. 4. This shows a square electrode e2 with a number of holes to allow for etching of the gap during manufacture and to allow air flow to reduce air damping. Four anchors (41) are shown, at each side of the square. Flexible supporting members stretch from each of the anchors to each corner of the square movable element e2. The spring constant of each of these can be set by the length, thickness and material type for example. The independently movable section e3 is also square and is located in a square aperture at the centre of the rest of the electrode e2. It is supported at each corner by a resilient coupling in the form of an elongate bar, from each corner of the aperture to the adjacent corner of the section e3. These couplings are shorter than the supporting members, and so will have a higher spring constant. The section e3 also has holes in a regular pattern to allow for etching and for air flow. The bottom electrode e1 is largely obscured below the other electrodes, and should be largely the same shape as the combination of the other electrodes. It has contact areas at top and bottom of the diagram.

FIG. 5 shows a diagrammatical cross-sectional view of the device 100 of the invention, while many others are possible. It shows, on top of a substrate 10, a layer 42 of electrically conducting material such as a metal, e.g. Al. In this layer 42, the first electrode e1 is defined that is arranged on the substrate 10. This first electrode e1 is separated from a movable element 40 by an air gap 60. This air gap 60 is made in by deposition of a first and a second insulating layer, which may mutually be separated by an intermediate metal layer. The insulating layers are subsequently removed by etching, for which through-holes are suitably available in the movable element 40. Both dry etching and wet etching techniques can be applied for the removal of the sacrificial layers, such as described in the applications EP 03104045.4 (PHNL031310) and WO 2004/037713-A1. The movable element 40 comprises in this case an electrically conductive material, such as aluminium or an aluminium alloy. However, other conductive materials such as Cu and Ni could be used and the movable element 40 does not need to be electrically conductive. The movable element 40 comprises a support 41 to the substrate 10, a main section 80 and according to the invention also an independently movable section 70. This independently movable section 70 is connected to the main section 80 with resilient coupling k2. Additionally, the movable element 40 comprises in this embodiment flexible elements $k_1$, but that is not strictly necessary. It is however preferred that the resilient coupling k2 has a larger elastic modulus than the flexible elements k1, for which the length of the coupling means k2 and the flexible elements k1 are the major parameter. In this example of an electrically conductive movable element 40 the coupling means k2 and the flexible elements k1 are both integrated into the metal layer. This is advantageous for processing reasons. In this example also, the main section 80 constitutes the second electrode e2, and the independently movable section 70 constitutes the third electrode e3. The first electrode e1 extends laterally, so as to face both the second and third electrodes e2, e3. The third electrode e3 is herein independently movable by means of the movement of the resilient coupling k2 and is attracted by the first electrode e1. It will more easily move towards the first electrode e1 than the second electrode e2.

This third electrode e3 is assumed to have a beneficial effect on the lifetime of the device 100. The lifetime of MEMS device is primarily dependent on charging effects, and not on metal fatigue or similar materials properties. The release voltage should be as high as possible in order to avoid said charging effects, which is the intended purpose of the third electrode. second and $3^{rd}$ conductive layers form e2, e3, k1 and k2, respectively.

FIG. 6 shows another embodiment that can produce an increase in the speed of switching. The speed of switching of a MEMS switch is usually strongly reduced by air damping. The closing speed of an electrostatic switch can be increased by applying a higher actuation voltage. However as the electrostatic force is always attractive, the opening speed is purely determined by the spring constant of the structure and the air damping. For a MEMS switch (where the dimensions of the membrane area are usually much larger than the gap distance) the dominant air damping force is the squeeze film damping force which is given by:

$$F_{sfd}=b_0 v/z^3 \quad (1)$$

Where v is the speed and z is the distance between the electrodes. One way to reduce the effect of air damping is to provide holes in the membranes to reduce the constant $b_0$.

FIG. 6 shows another way, using a stamp structure, which can improve on the conventional design as follows: it can increase the opening speed and can increase reliability by increasing the spring force separating the substrate and the movable element thus helping avoid stiction. This involves increasing $V_{rel}$ while leaving $V_{PI}$ unaffected (i.e. reduced stiction).

In addition to a conventional MEMS switch, which comprises 2 electrodes $e_1$ and $e_2$, separated by a gap $g_1$ and suspended by a spring $k_1$, the switch comprises a movable element which has an electrode e2 and an independently movable section termed a 'stamp'. This stamp is connected to the top (or bottom) electrode by a resilient coupling in the form of a spring $k_2$ and is separated from the substrate by a gap $g_2$. The stamp protrudes into the gap so that the gap g2 is smaller than the gap between the electrodes. The contact area A beneath the stamp is not used as an electrode, so the device area is increased slightly.

Effect on $V_{PI}$:

The equations that conventionally govern pull-in and release are: $V_{PI}^2=8k_1g_1^3/(27A\in_0)$ and $V_{rel}^2=2g_1k_1A\in_0/C_{down}$. First the difference between the pull-in and release voltage of the proposed switch and that of a conventional switch will be discussed. If $g_2$ is larger than $g_1/3$, the pull-in voltage $V_{PI}$ of the top membrane will not be affected, so at $V_{PI}$ the switch will close until the stamp touches the substrate. At that point the gap between the electrodes is $g_1-g_2$ and the effective spring constant of the switch will be $k_1+k_2$. From the pull-in equation it can be seen that the pull-in voltage of a structure with stamp will be the same as that without stamp as long as:

$k_1g_1^3>(k_1+k_2)(g_1-g_2k_2/(k_1+k_2))^3$.

FIG. 7 shows how $k_1/(k_1+k_2)$ varies with $g_2/g_1$. If for example $g_2=g_1/2$ and $k_2=k_1$, the pull-in voltage is not increased. The area for which $V_{PI}$ is not affected by the stamp is shown in FIG. 7 at the right side of the line. That is that the $V_{PI}$ in that area is the same for the MEMS element of the invention with an independently movable section, as for a conventional MEMS element without such movable section. Note that even if $V_{PI}$ is increased, the ratio of $V_{PI}/V_{rel}$ is still be beneficially influenced by the stamp.

Effect on $V_{rel}$:

The stamp increases V rel² by a factor:

$$\frac{V_{rel.stamp}^2}{V_{rel.conventional}^2}=1+\frac{k_2}{k_1}\left(1-\frac{g_2}{g_1}\right) \quad (2)$$

Thus it is seen that the stamp structure can increase the reliability of the MEMS structure. If for example, $g_2=0.6\, g_1$ and $k_2=9\, k_1$, the release voltage would increase by 90% as a result of the stamp, while leaving the pull-in voltage unaffected.

Effect on Speed:

Although the stamp will slow the switch a bit down during its closing motion, this effect will not be very large, as the force of the stamp is only significant when the switch is almost closed whereas the electrostatic force is very large in this region and can easily compensate the spring force. It can be shown that the speed of the switch during closing is largest when the electrodes are close together.

When opening, the opening force of the stamp will be very helpful in the first stages of the switch motion, as the air damping force is largest in this region (see equation (1)). That some extra force in the initial opening stages of the switch motion could reduce the switching time a lot, is confirmed by showing that a typical switch spends about 80% of the opening time to travel only the first 20% of the gap. If again $g_2=0.6\, g_1$ and $k_2=9k_1$ it is seen that the spring force in the closed state is increased by a factor of 4.6, which will surely increase the speed of the switch considerably, the switching time might be reduced by a factor of 2-3.

As described, a new MEMS design with a stamp structure incorporated can increase the speed and reliability of an electrostatic MEMS switch. The new design is expected to increase the speed by a factor of more than 2 and can decrease the ratio $V_{PI}/V_{rel}$ by a factor of about 2 thus increasing the reliability of the MEMS device.

A schematic view of a device with a stamp S supported on both sides is shown in FIG. 8. A plan view of a design of such a device is shown in FIG. 9. In FIG. 8, the stamp is supported by resilient couplings k2 on both sides. These couplings in the form of springs are anchored to the movable element. This movable element has an electrode e2 with an aperture in the middle to locate the stamp S. The stamp as before protrudes into the gap so that the gap g2 is smaller than the gap g1 at the electrodes. The electrode e1 on the substrate also has a gap in the middle for the contact area of the stamp. The movable element is supported by flexible supports in the form of springs k1 attached to anchor points 20. FIG. 9 shows a plan view of an integrated circuit having a similar arrangement. This corresponds to FIG. 5 except that the stamp is a smaller area than the independently movable section of electrode. The stamp shown needs no holes in it for air damping reduction. As shown the stamp has only two springs k2 rather than 4.

FIG. 10 shows in cross-sectional view the device of FIGS. 8 and 9. This Figure is similar to that of FIG. 4 and the same reference numbers refers to equal parts in both Figures. Again, this is only one embodiment, and the movable element 40 may well be constituted differently. In this example, the independently movable section 70 protrudes towards the substrate 10. This protrusion is formed both in that the metal layer of the movable element 40 is locally thicker and in that a stamp in a further intermediate layer 50 is present. As shown in FIG. 10, the resulting spacing g2 between the stamp 50 and the substrate 10 is smaller than that between the first and second electrodes e1, e2. Herein, the stamp 50 nor the independently movable section 70 is in use as an electrode, but has a mechanical function primarily. It is understood that instead of a single stamp 50 a plurality of stamps may be present, and that also the second electrode e2 may be provided with one or more stamps.

FIG. 11 shows in cross-sectional view a further device. This device is again similar to the device of FIG. 10, and the same reference numerals refer to equal elements. Herein the independently movable section 70 or actually the stamp 50 functions as a third electrode e3, that is facing a fourth electrode e4 on the substrate 10. This embodiment is very suitable, if the second pair of electrodes e3-e4 is for use as a galvanic switch, whereas the first pair of electrodes e1-e2 is for use as a variable capacitor and/or as an actuator. However, also both pairs of electrodes may have capacitive function.

It is understood that the advantage of the device results specifically from its position in the second, closed position. Usually, both the independently movable section 70 and the main section of the movable element (e.g. the second electrode e2) are attached to the substrate. The resilient coupling k2 between both sections is then under compressive stress and provide a counterforce. This is, in this example, due thereto that the movable element has a protrusion towards the substrate at the independently movable section. When both sections are attached to the substrate, the independently movable section is pushed upwards relatively to the main section. It is the resilient coupling that carries the resulting stress, and therewith provides a counterforce against stiction.

The MEM devices described above in any of the embodiments can be incorporated into integrated circuits, into mobile devices such as wireless phone handsets, or wireless mobile computing devices for example. Although described with regard to elements movable perpendicular to a substrate, in principle the movement can be parallel or have a component parallel. As described above, a MEM device has a movable element (30), a pair of electrodes (e1, e2) to move the movable element, one electrode having an independently movable section (e3), resiliently coupled to the rest of the respective electrode to provide additional resistance to a pull in of the electrodes. This can enable a higher release voltage $V_{rel}$, and thus reduced risk of stiction. Also, a ratio of $V_{PI}$ to $V_{rel}$ can be reduced, and so a greater range of voltage is available for movement of the movable element. This enables faster switching. The area of the independently movable section is smaller than the rest of the electrode, and the spring constant of the resilient coupling is greater than that of the flexible support. Alternatively, the movable element can have a movable stamp section resiliently coupled and protruding towards the substrate to provide an additional resistance to pull in when it contacts the substrate.

Thus, in summary the invention provides a MEM device has a movable element 30, a pair of electrodes e1, e2 to move the movable element, one electrode having an independently movable section e3, resiliently coupled to the rest of the respective electrode to provide additional resistance to a pull in of the electrodes. This can enable a higher release voltage $V_{rel}$, and thus reduced risk of stiction. Also, a ratio of $V_{pi}$ to $V_{rel}$ can be reduced, and so a greater range of voltage is available for movement of the movable element. This enables faster switching. The area of the independently movable section is smaller than the rest of the electrode, and the spring constant of the resilient coupling is greater than that of the flexible support. Alternatively, the movable element can have a movable stamp section resiliently coupled and protruding towards the substrate to provide an additional resistance to pull in when it contacts the substrate.

The invention claimed is:

1. A micro-electromechanical device comprising a first electrode on a substrate, a second electrode, which second electrode is part of a movable element and movable towards and from the first electrode between a first and a second, at least substantially closed position by elastic deformation of a deformable section of the movable element, and which second electrode is separated from the first electrode by a gap in its first position, wherein the gap between the first and second electrode may be varied so that micro-electromechanical device is a capacitive switch with a limited number of states,
   wherein the movable element comprises a first independently movable section that is coupled to a movable main section of the movable element by a first resilient coupling and a second independently movable section that is independently movable with respect to the main section and that is coupled to a movable main section of the movable element by a second resilient coupling, such that the first and second resilient coupling exerts a force on the movable element in a direction away from the first electrode, when the second electrode is in its second position, wherein the resilient couplings have a larger spring constant than the deformable section.

2. The device of claim 1, wherein the resilient coupling is arranged on at least two sides of the independently movable section.

3. The device of claim 2, wherein the independently movable section is on at least three sides surrounded by the movable main section.

4. The device of claim 1, wherein the movable main section is coupled to the deformable section.

5. The device of claim 1, wherein the deformable section is present as one or more flexible elements.

6. The device of claim 1, wherein a third electrode is arranged as part of the independently movable section of the movable element and wherein a fourth electrode is arranged on the substrate, facing the third electrode so as to form a second pair of electrodes.

7. The device of claim 1, wherein the first and second electrodes form a galvanic switch.

8. The device of claim 1, wherein the movable element is substantially constituted by a metal layer, and wherein the resilient coupling between the independently movable section and the movable main section is constituted as at least one bridge.

9. An integrated circuit having the device of claim 1.

10. A wireless communications device having an integrated circuit as set out in claim 9.

11. A method of offering a communications service over the communications device of claim 10.

12. A method of operation of the device of claim 1, wherein the second electrode is moved away from the first electrode by canceling of application of an actuation voltage.

13. The device of claim 1, wherein stiction between the first electrode and second electrode is reduced due to the presence of the resilient coupling.

14. The device of claim 1, wherein the independently movable section protrudes towards the substrate.

15. A variable capacitor device comprising:
 a substrate,
 a movable element comprising a deformable section to allow a portion of the movable element to move toward and away from the substrate, the movable element further comprising first independently movable resilient section, wherein the resilient section has a larger spring constant than the deformable section and wherein a second independently movable section is coupled to a movable main section of the movable element by a second resilient coupling, the second independent structure being is independently movable with respect to the deformable section; and
 a drive circuit coupled to the movable element to cause the portion of the movable element to move towards and away from the substrate such that a gap between the movable section and the substrate is varied in a manner such that a capacitance between the movable section and the substrate is varied.

16. The variable capacitor of claim 15, wherein the drive circuit comprises means for moving the movable element towards the substrate.

17. The variable capacitor of claim 15, wherein the first independently movable section protrudes towards the substrate.

* * * * *